United States Patent [19]

Meyer

[11] 4,389,981

[45] Jun. 28, 1983

[54] HYDROGEN GAS INJECTOR SYSTEM FOR INTERNAL COMBUSTION ENGINE

[76] Inventor: Stanley A. Meyer, 3792 Broadway Blvd., Grove City, Ohio 43123

[21] Appl. No.: 349,185

[22] Filed: Feb. 17, 1982

[51] Int. Cl.³ ............................................ F02M 23/04
[52] U.S. Cl. ................... 123/3; 123/73 AD; 123/568; 123/DIG. 12
[58] Field of Search ............... 123/1 A, 3, DIG. 12, 123/73 AD, 198 D, 568; 48/116, 180 CF

[56] References Cited

U.S. PATENT DOCUMENTS

| | | | |
|---|---|---|---|
| 1,996,861 | 4/1935 | Dores et al. | 123/198 D |
| 2,109,963 | 3/1938 | Kruse | 48/180 C |
| 3,982,878 | 9/1976 | Yamane et al. | 123/1 A |
| 4,031,865 | 6/1977 | Dufour | 123/DIG. 12 |
| 4,059,086 | 11/1977 | Tsubouchi | 123/73 AD |

Primary Examiner—William A. Cuchlinski, Jr.
Attorney, Agent, or Firm—Anthony D. Cennamo

[57] ABSTRACT

System and apparatus for the controlled intermixing of a volatile hydrogen gas with oxygen and other non-combustible gasses in a combustion system. In a preferred arrangement the source of volatile gas is a hydrogen source, and the non-combustible gasses are the exhaust gasses of the combustion system in a closed loop arrangement. Specific structure for the controlled mixing of the gasses, the fuel flow control, and safety are disclosed.

19 Claims, 9 Drawing Figures

HYDROGEN GAS INJECTOR SYSTEM FOR INTERNAL COMBUSTION ENGINE

CROSS REFERENCES AND BACKGROUND

There is disclosed in my co-pending U.S. patent application Ser. No. 802,807 filed Sept. 16, 1981 for a Hydrogen-Generator, a generating system converting water into hydrogen and oxygen gasses. In that system and method the hydrogen atoms are disocciated from a water molecule by the application of a non-regulated, non-filtered, low-power, direct current voltage electrical potential applied to two non-oxidizing similar metal plates having water passing there-between. The subatomic action is enhanced by pulsing the non-regulated and non-filtered direct current voltage. The apparatus comprises structural configurations in alternative embodiments for segregating the generated hydrogen gas from the oxygen gas.

In my co-pending patent application filed May 5, 1981, U.S. Ser. No. 262,744 now abandoned for Hydrogen-Airdation Processor, non-volatile and non-combustible gasses are controlled in a mixing stage with a volatile gas. The hydrogen airdation processor system utilizes a rotational mechanical gas displacement system to transfer, meter, mix, and pressurize the various gasses. In the gas transformation process, ambient air is passed through an open flame gas-burner system to eliminate gasses and other present substances. Thereafter the non-combustible gas-mixture is cooled, filtered for impurity removal, and mechanically mixed with a pre-determined amount of hydrogen gas. There results a new synthetic gas. The synthetic gas formation stage also volume meters and determines the proper gas-mixing ratio for establishing the desired burn-rate of hydrogen gas. The rotational mechanical gas displacement system in that process determines the volume-amount of synthetic gas to be produced.

The above-noted hydrogen airdation processor, of my co-pending application, is a multi-stage system having utility in special applications. Whereas the hydrogen generator system of my other mentioned co-pending application does disclose a very simple and unique hydrogen generator.

In my co-pending patent application Ser. No. 315,945, filed Oct. 18, 1981 there is disclosed a combustion system having utility in a mechanical drive system. Particularly in one instance to drive a piston in an automotive device. There is shown a hydrogen generator for developing hydrogen gas, and perhaps other non-volatile gasses such as oxygen and nitrogen. The hydrogen gas with the attendant non-volatile gasses are fed via a line to a controlled air intake system. The combined hydrogen, non-volatile gasses, and the air after inter-mixing are fed to a combustion chamber where it is ignited. The exhaust gasses of the combustion chamber are returned in a closed loop arrangement to the mixing chamber for the mixture of volatile and non-combustible gasses. Particular applications and structural embodiments of the system are disclosed.

SUMMARY OF INVENTION

The system of the present invention in its most preferred embodiment is for a combustion system utilizing hydrogen gas; particularly to drive a piston in an automobile device. The system utilizes a hydrogen generator for developing hydrogen gas. The hydrogen gas and other non-volatile gasses are fed to a mixing chamber also having oxygen fed thereto. The mixture is controlled to regulate the burning temperature; that is, to lower the temperature velocity of the hydrogen gas to that of the commercial fuels. The hydrogen gas feed line to the combustion chamber includes a fine linear control gas flow valve. An air intake is the source of oxygen and it also includes a variable valve. The exhaust gasses from the combustion chamber are utilized in a controlled manner as the non-combustible gasses.

The hydrogen generator is improved upon to include a holding tank to provide a source of start-up fuel. Also, the hydrogen gas generator includes a switch to the power source operable from one position to another dependant upon a pressure sensing switch on the combustion chamber.

The simplified structure includes a series of one-way valves, safety valves, and quenching apparatus. The combination of apparatus comprises the complete assembly for converting the standard automobile engine from gasoline (or other fuels) to the hydrogen gas mixture.

OBJECTS

It is accordingly a principal object of the present invention to provide a combustion system of gasses combined from a source of hydrogen and non-combustible gasses.

Another object of the invention is to provide such a combustion system that intermixes the hydrogen and non-combustible gasses in a controlled manner and thereby control the combustion temperature.

A further object of the invention is to provide such a combustion system that controls the fuel flow to the combustion chamber in s system and apparatus particularly adapted to hydrogen gas.

Still other objects and features of the present invention will become apparent from the following detailed description when taken in conjunction with the drawings in which:

DETAILED DESCRIPTION OF INVENTION TAKEN WITH DRAWINGS

Figure 1:
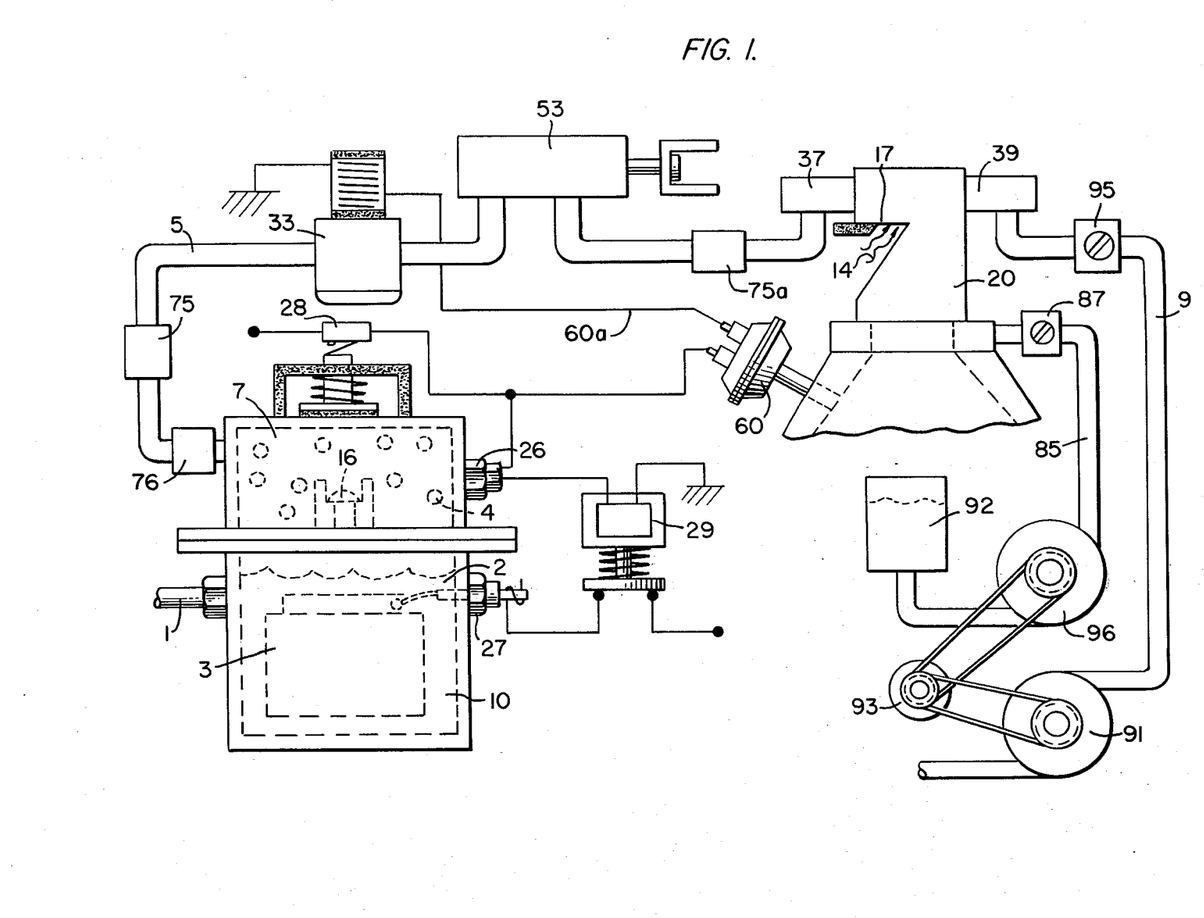
FIG. 1 is a mechanical schematic illustration partly in block form of the present invention in its most preferred embodiment.

Referring to FIG. 1 the complete overall gas mixing and fuel flow system is illustrated together for utilization in a combustion engine particularly an engine utilized in an automobile.

With specific reference to FIG. 1, the hydrogen source 10 is the hydrogen generator disclosed and described in my co-pending application, supra. The container 10 is an enclosure for a water bath 2. Immersed in the water 2 is an array of plates 3 as further described in my co-pending application, supra. Applied to plates 3 is a source of direct current potential via electrical inlet 27. The upper portion 7 of the container 10 is a hydrogen storage area maintaining a predetermined amount of pressure. In this way for start up there will be an immediate flow of hydrogen gas. To replenish the expended water the generator provides a continuous water source 1. Thereafter, the generator is operable as described in the aforesaid patent application.

The safety valve 28 is rupturable upon excessive gas build-up. Whereas the switch 26 is a gas pressure switch to maintain a predetermined gas pressure level about a regulated low-volume.

The generated hydrogen gas 4 is fed from the one-way check valve 16 via pipe 5 to a gas mixing chamber 20, wherein the hydrogen gas is inter-mixed with non-combustible gasses via pipe line 9 from a source hereinafter described.

In the event one way valve 75 should fail and there be a return spark that might ignite the hydrogen gas 4 in the storage area 7 of hydrogen generator 10, quenching assembly 76 will quench the spark and prevent such ignition.

Figure 2:
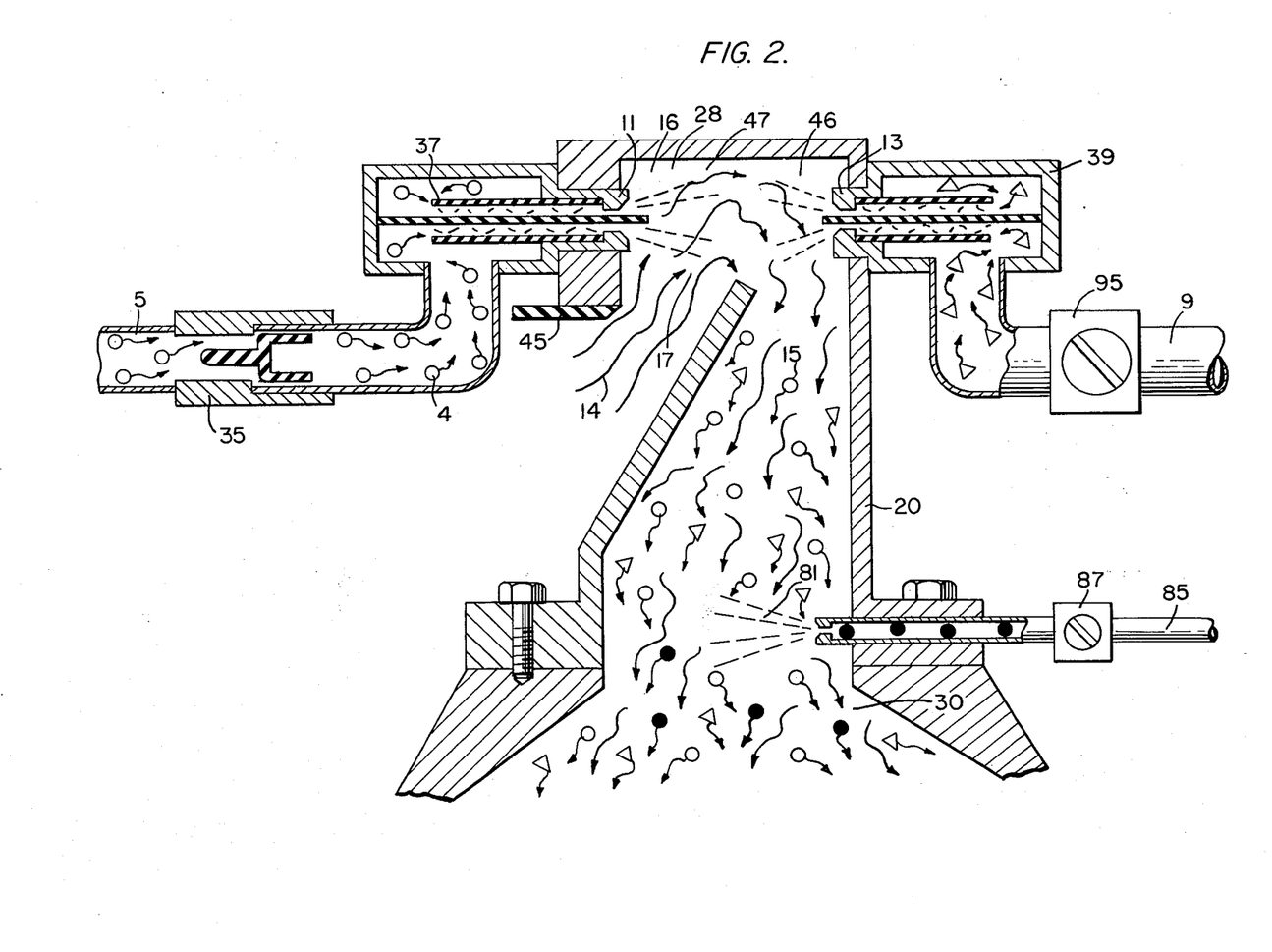
FIG. 2 is a block schematic illustration of the preferred embodiment of the hydrogen injector system of FIG. 1.

With particular reference to FIG. 2 the hydrogen gas via pipe line 5 and non-combustible gasses via pipe line 9 are fed to a carburator (air-mixture) system 20 also having an ambient air intake 14.

The hydrogen gas 4 is fed via line 5 through nozzle 11 in a spray 16 in to the trap area 46 of the mixing chamber 20. Nozzle 11 has an opening smaller than the plate openings in the quenching assembly 37, thereby preventing flash back in the event of sparking. The non-volatile gasses are injected into mixing chamber 20 trap area 47 in a jet spray 17 via nozzle 13. Quenching assembly 39 is operable much in the same manner as quenching assembly 37.

The ambient air is, in the preferred arrangement, the source of oxygen necessary for the combustion of the hydrogen gas. Further, as disclosed in the aforesaid co-pending application the non-volatile gasses are in fact the exhaust gasses in a closed loop system. It is to be understood that the oxygen and/or the non-combustible gasses can be from an independant source.

With continued reference to FIG. 2 the gas trap area 47 is a predetermined size. In that hydrogen is lighter than air, the hydrogen will rise and become entrapped in the are 47. The size of area 47 is sufficient to contain enough hydrogen gas for instant ignition upon start up of the combusiton engine.

It will be noted that the hydrogen gas is injected in the uppermost region of the trap area 47. Hydrogen rises at a much greater velocity than oxygen or non-combustible gasses; perhaps three times or greater. Therefore, if the hydrogen gas entered the trap area 47 (mixing area) at its lowermost region the hydrogen gas would rise so rapidly that the air could not mix with the oxygen. With the structure shown in FIG. 2 of the trap area 47, the hydrogen gas is forced downwardly into the air intake 15. That is, the hydrogen gas is forced downwardly into the upwardly forced air and readily mixed therewith.

The ratio of the ambient air (oxygen) 14 and the non-combustible gas via line 9 is a controlled ratio and determined by the particular engine. Once the proper combustion rate is determined by the adjustment of valve 95 for varying the amount of the non-combustible gas and the adjustment of valve 45 for varying the amount of the ambient air, the ratio is maintained.

In a system wherein the non-combustible gasses are the exhaust gasses of the engine in a closed loop-arrangement, and wherein the air intake is under the control of the engine, the flow velocity and hence the air/non-combustible mixture, is maintained by the acceleration of the engine.

The mixture of air with non-combustible gasses becomes the carrier for the hydrogen gas. That is, the hydrogen gas is superimposed on the air/non-combustible mixture. By varying the amount of hydrogen gas superimposed on the air/non-combustible mixture, the r.p.m. of the engine is controlled.

Figure 3:
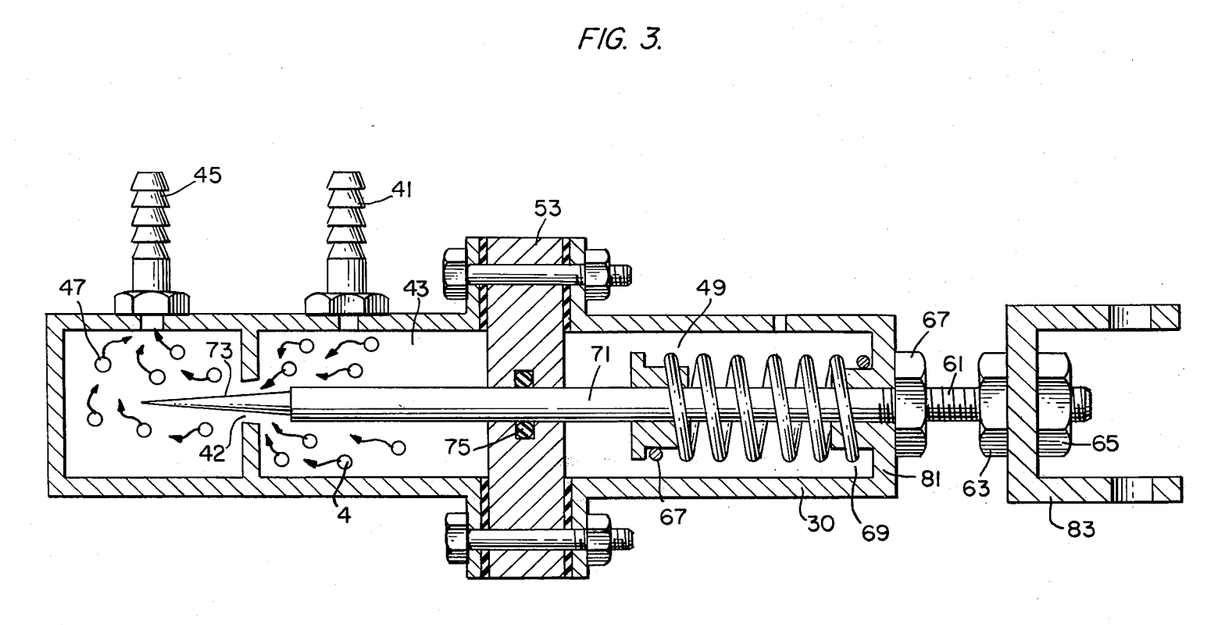
FIG. 3 is the fine linear fuel flow control shown in FIG. 1.

Reference is made to FIG. 3 illustrating precisely in a side view crossection the fine linear fuel flow control 53. The hydrogen gas 4 enters chamber 43 via gas inlet 41. The hydrogen gas passes from chamber 43. The hydrogen gas passes from chamber 43 to chamber 47 via port or opening 42. The amount of gas passing form chamber 43 to chamber 47 is controlled by controlling the port opening 42.

The port opening is controlled by the insertion there through the linearly tapered pin 73. The blunt end of pin 73 is fixed to rod 71. Rod 71 passed by supporting O-ring 75, through opening 81 in housing 30, to manual adjustment mechanism 83.

The spring 49 retains the rod 71 is a fixed position relative to the pin 73 and opening 42. Upon actuating the mechanism 83, the pin 73 will recede from the opening 42 there by increasing the amount of gas passing from chamber 43 to chamber 47.

The stops 67 and 69 maintain spring 49 in its stable position. The position of the pin 73 in a fixed position relative to opening 42 is adjusted via threaded nuts 63 and 67 on threaded rod 61. That is, the threaded adjustment controls the idle speed or permits the minimum amount of gas to pass from chamber 43 to chamber 47 for continuous operation of the combustion engine.

Figure 8:
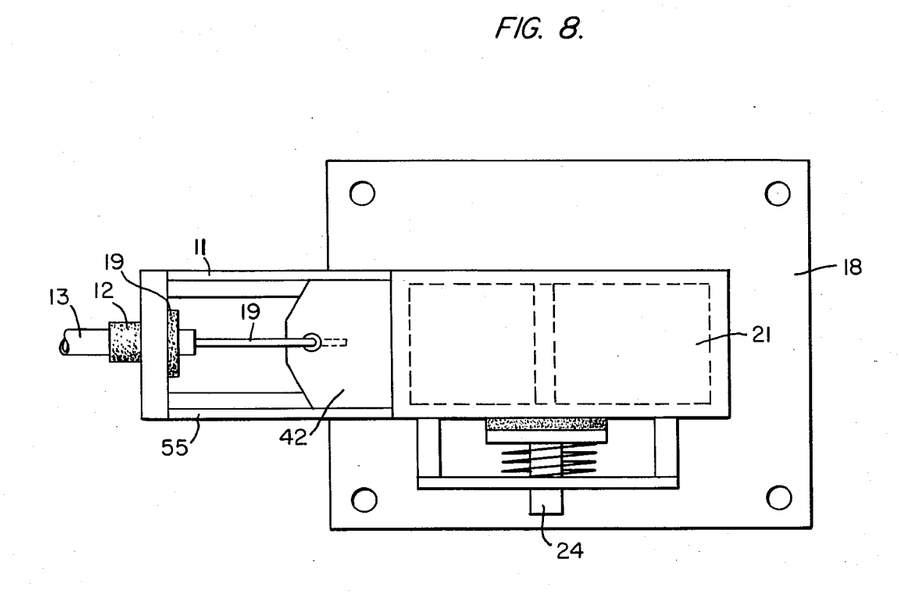
FIG. 8 is a top view of the air intake valve to fuel mixing chamber.

Referring now to FIG. 8 there is illustrated the air adjustment control for manipulating the amount of air passing into the mixing chamber 20. The closure 21 mounted on plate 18 has an opening 17 on end 11 thereof. Slideably mounted over said opening 17 is a plate control 42. The position of the plate relative to the opening 17 is controlled by the position of the control rod 19 passing through a grommet 12 to control line. In event of malfunction that may cause combustion of gasses in mixing chamber 20, release valve 24 will rupture.

Figure 4:
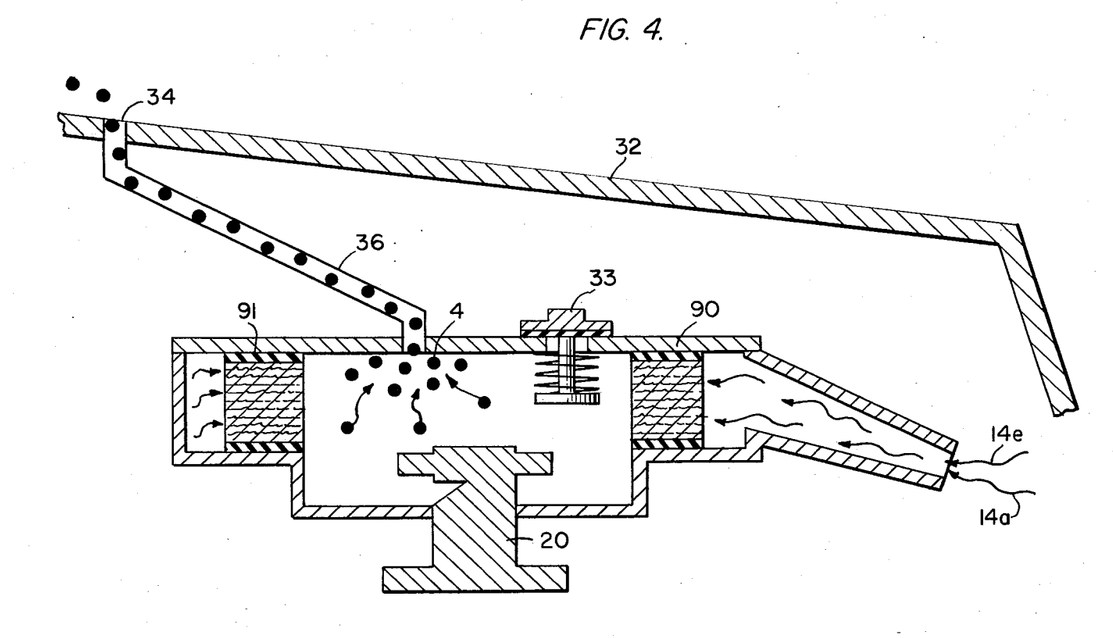
FIG. 4 is crossectional illustration of the complete fuel injector system in an automobile utilizing the concepts of the present invention.

With reference now to FIG. 4, in the event hydrogen gas 4 should accumulate in the mixing chamber 20 to excessive pressure, an escape tube 36 connected to a port 34 on the automobile hood 32 permits the excess hydrogen gas to safely escape to the atmosphere. In the event of a malfunction that may cause combustion in the mixing chamber 20, the pressure relief valve 33 will rupture expelling hydrogen gas without combustion.

In the constructed arrangement of FIG. 1, there is illustrated a gas control system that may be retrofitted to an existing automobile internal combustion engine without changing or modifying automobile's design parameters or characteristics.

The flow of the hydrogen volatile gas is, of course, critical; therefore, there is incorporated in line 5 a gas flow valve 53 (FIG. 1) to adjust the hydrogen flow. Gas flow valve is described in detail with reference to FIG. 3.

The intake air 14 may be in a carburator arrangement with an intake adjustment 55 that adjusts the plate 42 opening and also more fully described with reference to FIG. 8.

To maintain constant pressure in hydrogen gas storage 7 in the on-off operation of the engine, the gas flow control valve is responsive to the electrical shut-off control 33. The constant pressure permits an abundant supply of gas on start up and during certain periods of running time in re-supply.

The switch 33 is in turn responsive to the vacuum control switch 60. During running of the engine vacuum will be built up which in turn leaves switch 33 open by contact with vacuum switch 60 through lead 60a. When the engine is not running the vacuum will decrease to zero and through switch 60 will cause electrical switch 33 to shut off cutting off the flow of hydrogen gas to the control valve 53.

As low-voltage direct current is applied to safety valve 28, solenoid 29 is activated. The solenoid applies a control voltage to the hydrogen generator exciter 3 via terminal 27 through pressure switch 26. As the electrical power activates electric solenoid 29, hydrogen gas is caused to pass through flow adjustment valve 16 and then outlet pipe 5 for utilization. The pressure differential hydrogen gas output to gas mixing chamber 20 is for example 30 lbs. to 15 lbs. Once hydrogen generator 10 reaches an optimum gas pressure level, pressure switch 26 shuts off electrical power to the hydrogen excitors. If the chamber pressure exceeds a predetermined level, the safety release valve 28 is activated disconnecting the electrical current and thereby shutting down the entire system for safety inspection.

Figure 5:
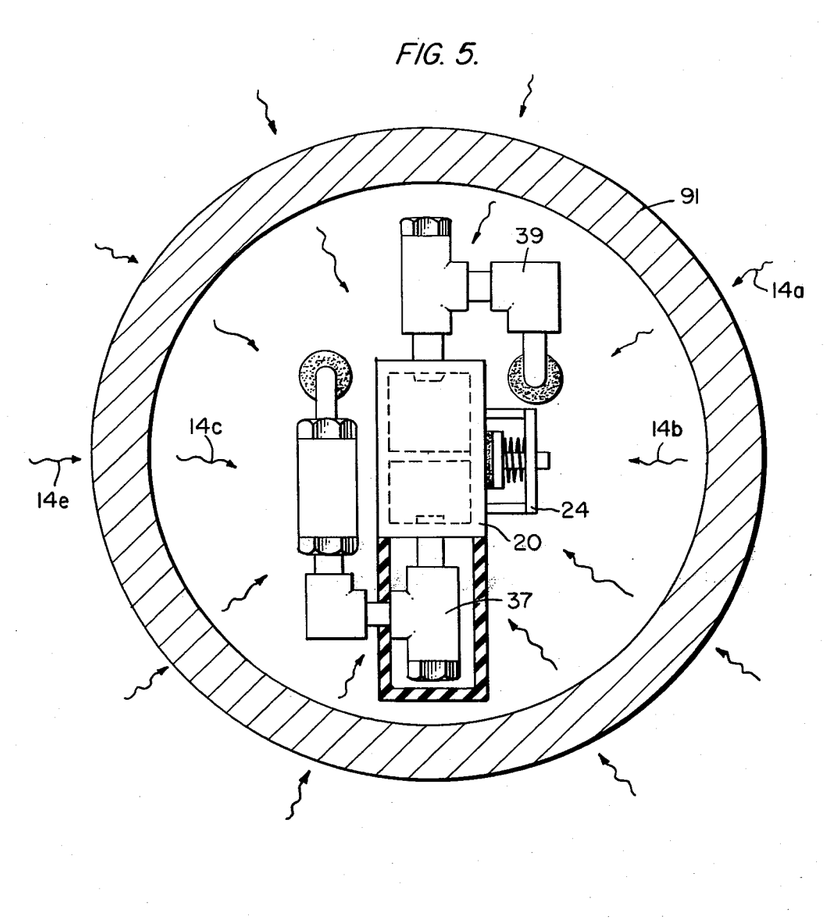
FIG. 5 is a schematic drawing in a top view of the fuel injector system utilized in the preferred embodiment.
Figure 6:
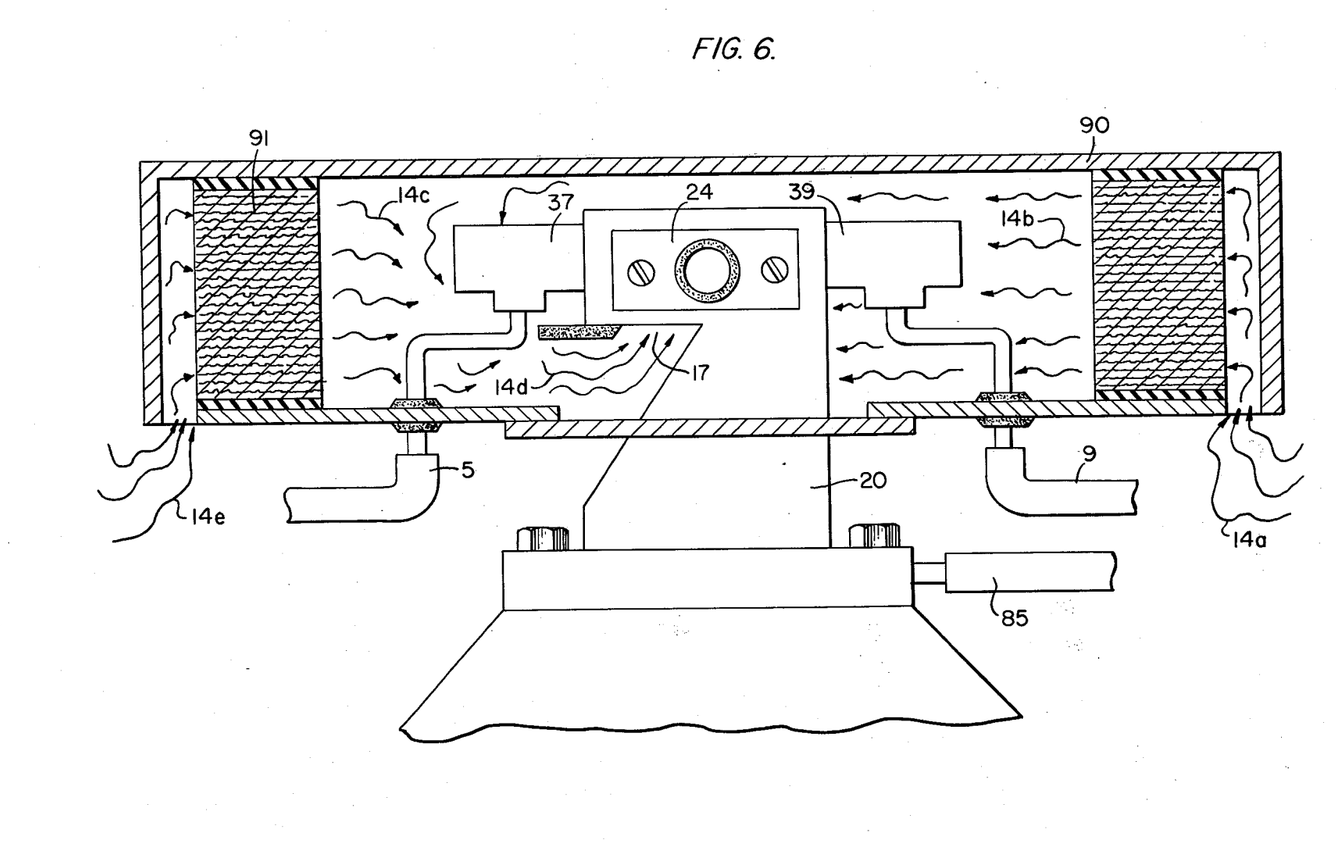
FIG. 6 is a crossectional side view of the fuel injector system in the present invention.

With particular reference now to FIG. 6 there is illustrated the fuel injector system in a side crossectional view and to FIG. 5 in a top view. The structural apparatus incorporated in the preferred embodiment comprises housing 90 having air intakes 14a and 14e. The air passes through filter 91 around the components 14b and 14c and then to intake 14d of the mixing chamber 20. The hydrogen enters via line 5 via quenching plates 37 and into the mixing chamber 20. The non-volatile gasses pass via line 9 to the quenching plates 39 and into the mixing chamber 20.

Figure 7:
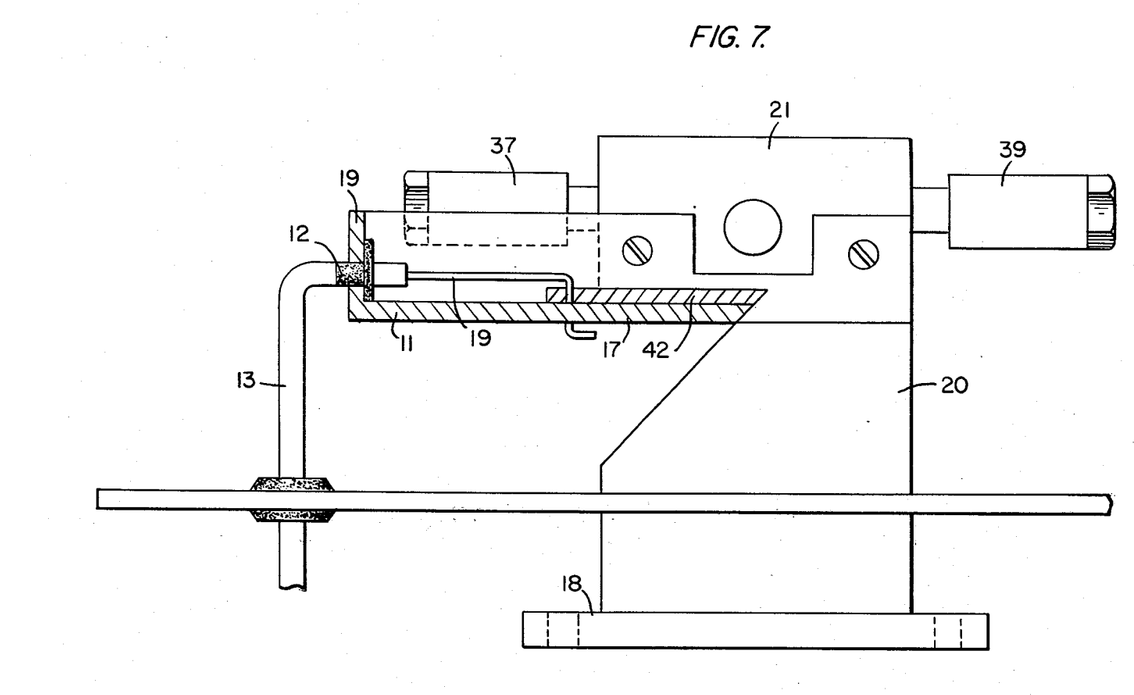
FIG. 7 is a side view of the fuel mixing chamber.

FIG. 7 illustrates the mechanical arrangement of components comprising the overall structure of the mixing chamber 20 and shown independantly in the other figures.

Returning to FIG. 1 there is illustrated the non-volatile gas line 9 passing through mixture pump 91 by engine pulley 93. Valve 95 controls the rate of flow.

Also driven by pulley 93 is pump 96 having line 85 connected to an oil resevoir 92 and valve 87 and finally to mixing chamber 20. As a practical matter, such as in a non-oil lubricated engine, lubricating fluid such as oil 81 is sprayed in the chamber 20, via oil supply line 85 for lubrication.

There has been several publications in the past year or so delving on the properties of Hydrogen gas, its potential use, generating systems, and safety. One such publication is "Selected Properties of Hydrogen" (Engineering Design Data) issued February 1981 by the National Bureau of Standards.

These publications are primarily concerned with the elaborate and costly processes for generating hydrogen. Equally so, they are concerned with the very limited use of hydrogen gas because of its extremely high burning velocities. This in turn reflects the danger in the practical use of hydrogen.

Figure 9:
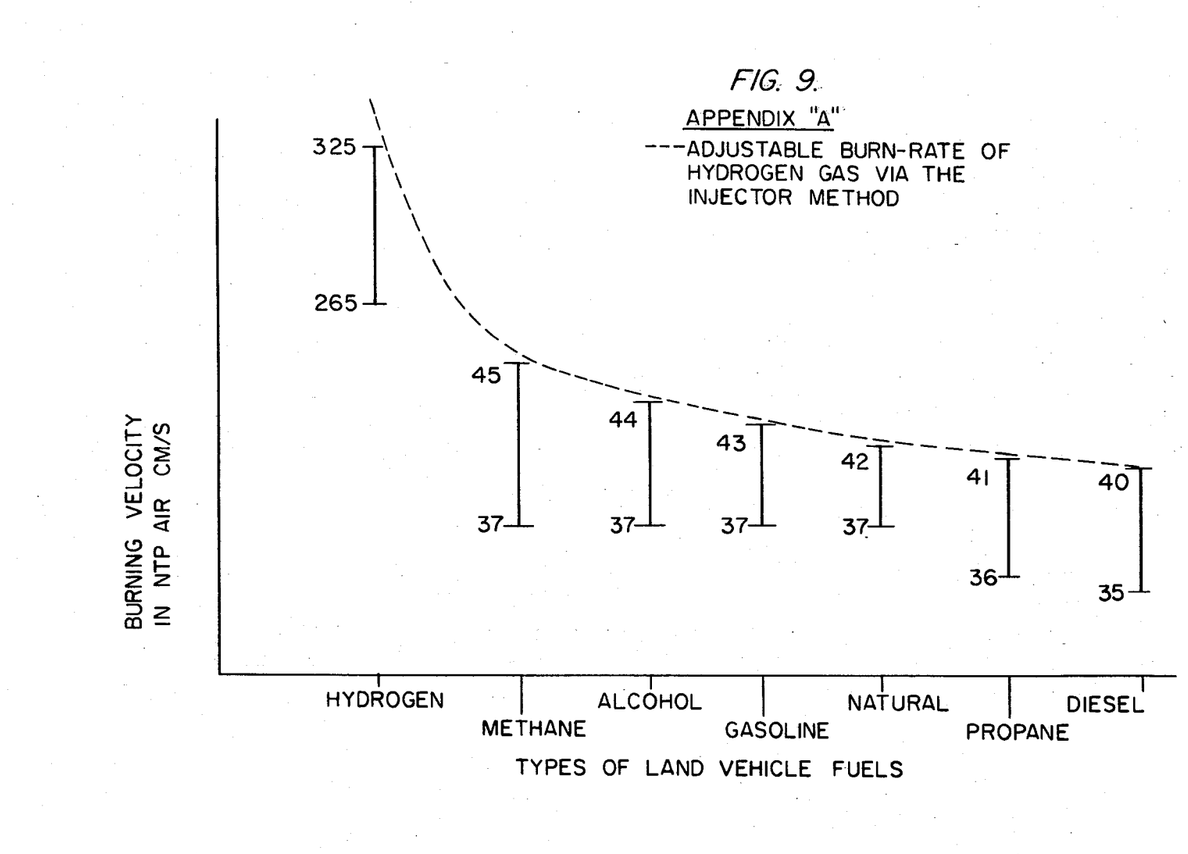
FIG. 9 is a comparison of the burning velocity of hydrogen with respect to other fuels.

With reference to the graph of the Appendix A, it is seen that the burning velocities of alcohol, propane, methane, gasoline, natural gas, and diesel oil are in the range of minimum 35 to maximum 45. Further, the graph illustrates that the burning velocity of hydrogen gas is in the range of 265 minimum to 325 maximum. In simple terms in the order of 7.5 times the velocity of ordinary commercial fuels.

Because of the hydrogen gas unusually high burning velocity, hydrogen gas has been ruled out, by these prior investigators as a substitute fuel. Furhter, even if an engine could be designed to accomodate such high velocities, the danger of explosion would eliminate any thoughts of commercial use.

The present invention, as above described, has resolved the above-noted criterea for the use of hydrogen gas in a standard commercial engine. Primarily, the cost in the generation of hydrogen gas, as noted in the aforementioned co-pending patent applications, is most minimal. Water with no chemicals or metals is used. Also, as note in the aforementioned co-pending patent applications, is the reduction in the hydrogen gas velocity. These co-pending applications not only teach the reduction in velocity, but teach the control of the velocity of the hydrogen gas.

In the preferred embodiment, practical apparatus adapting the hydrogen generator to a combustion engine is described. The apparatus linearly controls the hydrogen gas flow to a mixing chamber mixing with a controlled amount of non-combustible gas oxygen, hence, the reduction in the hydrogen gas velocity. The reduction in the hydrogen gas velocity makes the use of hydrogen as safe as other fuels.

In more practical terms the ordinary internal combustion engine of any size or type of fuel, is retrofitted to be operable with only water as a fuel source. Hydrogen gas is generated from the water without the use of chemicals or metals and at a very low voltage. The burning velocity of the hydrogen gas has been reduced to that of conventional fuels. Finally, every component or step in the process has one or more safety valves or features thereby making the hydrogen gas system safer than that of conventional automobiles.

In the above description the terms non-volatile and non-combustile were used. It is to be understood they are intended to be the same; that is, simply, gas that will not burn.

Again, the term storage has been used, primarily with respect to the hydrogen storage area 7. It is not intended that the term "storage" be taken literally—in fact it is not storage, but a temporary holding area. With respect to area 7, this area retains a sufficient amount of hydrogen for immediate start-up.

Other terms, features, apparatus, and the such have been described with reference to a preferred embodiment. It is to be understood modifications and alternatives can be had without departing from the spirit and scope of the invention.

I claim:

1. A combustion system comprising:
a hydrogen/oxygen generator, a housing having a water reservoir for retaining natural water therein and a gas collection chamber maintaining a preset volume of gas under pressure, a pair of similar non-oxidizing plates positioned in said water reservoir, a direct current voltage source connected to said plates to disassociate the hydrogen atoms and oxygen atoms from said water molecules; and a gas mixing chamber, means connecting the hydrogen gas from said hydrogen source to said mixing chamber, a fuel linear control valve in said hydrogen gas connecting means for regulating the hydrogen gas flow to said mixing means, said fuel linear control valve including a port and a linear element in said port regulating the opening therein, a source of non-volatile gas;

means connecting the non-volatile gas from said non-volatile source to said mixing chamber, ambient air intake means connected to the input of said mixing chamber for combining air with said hydrogen gas and said non-volatile gasses, a gas burner having said controlled amount of hydrogen gas combined with said non-volatile gas and ambient air from said air-intake means fed thereto.

2. The combustion system of claim 1 wherein said ambient air-intake means further comprises a housing having a variably positioned plate valve thereover for controlling the amount of air-intake to said mixing chamber.

3. The combustion system of claim 1 further comprising a housing in said hydrogen gas connecting means having intake and outlet means and a port intermediate therein and wherein said linear element is positioned in said port.

4. The combustion system of claim 1 wherein said linear element is a tapered structure.

5. The combustion system of claim 4 further including a rod mechanism connected to said tapered structure, and means for varying said tapered structure relative to said port.

6. The combustion system of claim 1 wherein said mixing chamber comprises a quenching apparatus at its hydrogen gas input and a quenching apparatus at its non-volatile gas input.

7. The combustion system of claim 1 wherein said gas mixing chamber comprises at its uppermost region a trap area; and wherein said hydrogen gas connection to said mixing chamber is in the uppermost region of said trap area.

8. The combustion system of claim 7 wherein said ambient air intake is in the lowermost region of said trap.

9. The combustion system of claim 8 wherein said ambient air intake means comprises a control valve and wherein said non-combustible gas intake means comprises a control valve, said valves adjustable to permit predetermined ratio mixtures of air and non-combustible gas to enter said mixing chamber.

10. The combustion system of claim 8 wherein said ambient air intake provides a hydrogen release for excess hydrogen in said trap area in said combustion chamber.

11. The combustion system of claim 7 wherein said control valve connected to said burner is a pressure regulated valve.

12. The combustion system of claim 7 further comprising housing means for enclosing said mixing chamber, a first opening in said housing for the intake of air, and a second opening in said housing for the release of hydrogen gas that may be entrapped therein.

13. The combustion system of claim 1 further comprising a control valve connected to said burner and said hydrogen gas fuel connection means for controlling the flow of gas during on and off operation of said combustion system.

14. The combustion system of claim 1 wherein said hydrogen gas generator upper enclosed area further comprises a pressure relief valve operable upon the hydrogen gas retained therein exceeding a pre-determined amount.

15. The combustion system of claim 14 wherein said hydrogen gas generator further comprises a sensing switch connected to said electrical source and said pressure relief valve and operable to disconnect said electrical source when said combustion system is inoperable.

16. The combustion system of claim 1 and wherein said means for connecting said hydrogen gas to said mixing chamber comprises one-way check valve.

17. The combustion system of claim 1 and wherein said means for connecting said hydrogen gas to said mixing chamber further comprises a quenching assembly.

18. The combustion system of claim 1 wherein said gas burner is an internal combustion engine, and wherein said source of non-volatile gasses is the exhaust for gasses of said engine.

19. The combustion system of claim 18 further comprising an oil source and an oil spray connected thereto and to said mixing chamber.

* * * * *